United States Patent [19]
Matsumoto

[11] Patent Number: 4,536,777
[45] Date of Patent: Aug. 20, 1985

[54] LIQUID JET RECORDING APPARATUS

[75] Inventor: Haruyuki Matsumoto, Tokyo, Japan

[73] Assignee: Canon Kabushiki Kaisha, Tokyo, Japan

[21] Appl. No.: 601,357

[22] Filed: Apr. 18, 1984

[30] Foreign Application Priority Data

Apr. 21, 1983 [JP] Japan .................................. 58-70823

[51] Int. Cl.$^3$ ............................................. G01D 15/18
[52] U.S. Cl. ............................. 346/140 R; 346/140 A
[58] Field of Search ................... 346/140 PD, 140 IJ, 346/75

[56] References Cited

U.S. PATENT DOCUMENTS

| | | | |
|---|---|---|---|
| 4,015,272 | 3/1977 | Yamamori et al. | 346/140 PD |
| 4,095,237 | 6/1978 | Amberntsson et al. | 346/140 PD |
| 4,126,868 | 11/1978 | Kirner | 346/140 PD |
| 4,153,902 | 5/1979 | Kanayama | 346/140 IJ |
| 4,301,459 | 11/1981 | Isayama et al. | 346/140 PD |
| 4,418,353 | 11/1983 | Thomas | 346/140 PD |
| 4,463,362 | 7/1984 | Thomas | 346/140 PD |

Primary Examiner—George H. Miller, Jr.
Attorney, Agent, or Firm—Fitzpatrick, Cella, Harper & Scinto

[57] ABSTRACT

In a liquid jet recording apparatus comprising a liquid jet section including orifice means for discharging a liquid to form flying droplets and liquid path means communicating with said orifice means and having as a part an energy acting portion for causing the energy to act on the liquid to form said flying droplets, and a liquid chamber communicating with said liquid path means and containing the liquid supplied to said liquid path means, the apparatus further comprises an air vent path formed in a member defining the liquid jet section and used to extract air from said liquid chamber, the air vent path has an inlet opened to the liquid chamber and an outlet formed on the liquid jet section, and the air vent path is defined by a groove formed on a plate by etching, on which plate groove means defining the liquid path means is similarly formed.

5 Claims, 4 Drawing Figures

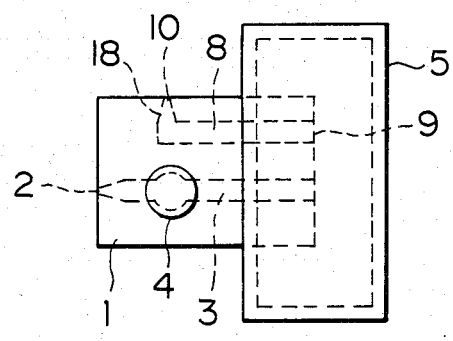
F I G. 3
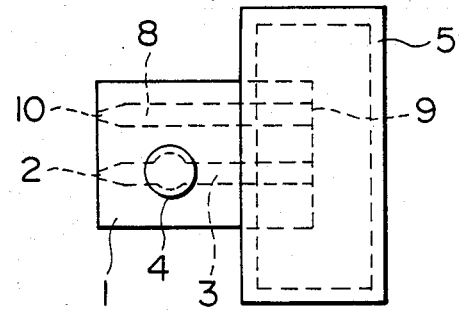
F I G. 4

LIQUID JET RECORDING APPARATUS

BACKGROUND OF THE INVENTION

1. Field of the Invention

The present invention relates to a liquid jet recording apparatus which discharges flying droplets from the discharge ports thereof to effect recording.

2. Description of the Prior Art

Non-impact recording methods have recently drawn attention and great interest has been taken therein because noise occurring during recording is negligibly small. Among them, the ink jet recording method (liquid spray type recording method) is extremely useful since high-speed recording is possible and full-color recording can be accomplished without requiring the special process of fixing images on so-called plain paper, and some of the ink jet recording apparatus have been already produced.

The liquid jet recording method is characterized in that a droplet of a recording liquid so-called ink is deposited on a material to be recorded. This method can be classified into kinds of systems depending on how to form droplets of the recording liquid and the direction of movement of the formed droplets.

For example, U.S. Pat. Nos. 3,683,212; 3,747,120 and 3,946,398 disclose a so-called drop-on-demand type recording method in which a recording liquid is discharged to form flying droplets through orifices in response to recording signals, and the droplets are deposited on the entire surface of a material to be recorded. Since, in the drop-on-demand type recording method, only a necessary amount of droplets can be discharged, it is not necessary to provide any particular means for collecting or treating excessive droplets so that the entire system can be simplified and reduced in size, and it is not required to control the discharged droplets in the direction of flying. Further, multi-color recording can easily be carried out in the drop-on-demand recording system.

Japanese Laid-open Patent Application 51837/1979 discloses a liquid jet recording system utilizing a principle completely different from that of the above drop-on-demand type recording system. This liquid jet recording system is very effectively compatible with the above stated drop-on-demand recording method and also provides a recording head with a high density multi-orifice, which can easily be embodied in practice. Therefore, recorded images of higher resolution and quality can be obtained at higher speeds.

Such a liquid jet recording apparatus used in the drop-on-demand recording method comprises a recording head including orifices for discharging droplets, liquid path respectively communicating with the corresponding orifices and each having an energy generating element for forming flying droplets, and a liquid chamber communicating with the respective liquid path to supply the liquid, and the recording head is fixed to a carriage which can be moved to scan a material to be recorded. The recording head is generally formed into a relatively small size so that the amount of liquid stored within the liquid chamber is limited with the possible recording period being very reduced. To solve such a problem, the liquid chamber in the recording head is normally connected with an ink tank located remotely from the carriage through a liquid supplying tube.

If bubbles are enter in the liquid passages, the jet of droplets becomes very unstable so that unnecessary droplets called "satellites" are secondarily jetted, and, in the worst case, the discharge of the droplets from the orifices cannot be performed. It is therefore required that the liquid to be supplied from the ink tank to the liquid path of the recording head through the liquid supplying tube is supplied on the condition that the air which exists in the liquid to be deposited thereafter or is entered from the wall of the liquid supplying tube during the supply of the liquid is separated from the liquid to be supplied to the liquid path. For the purpose, this liquid chamber is required to be designed such that the chamber has the function of separating the air from the liquid to prevent the air from entering into the liquid path, so that an air vent path is required to be provided in the liquid chamber. However, in the air vent operation utilizing the air vent tube, it is required that, firstly, the outlet of the air vent tube is outwardly exposed the unnecessary air is extracted together with the liquid from the liquid chamber, and then the closure the air vent tube is executed. Therefore the discharged liquid may contaminate an operator or the apparatus itself. U.S. Pat. No. 4,126,868 discloses a proposal for overcoming the above problem with respect to the discharge of separated bubbles. In accordance with this proposal, the liquid chamber includes an air vent path having a capillary tube. The air vent path is opened and closed under the capillary action of the liquid within the capillary tube. The capillary tube may be provided by connecting a capillary tube of glass or the like to the inner wall of the liquid chamber by the use of adhesive or the like, by accurately machining a bore serving as a capillary tube in the wall of the liquid chamber or by molding a liquid chamber with a capillary bore therein. In any event, it is difficult to form the capillary tube or bore in the liquid chamber with the desired accurate shape and size in a mass-production manner.

SUMMARY OF THE INVENTION

It is an object of the present invention to provide a liquid jet recording apparatus of such a structure that an air vent path having a capillary tube formed therein can easily be provided in the liquid chamber.

Another object of the present invention is to provide a liquid jet recording apparatus which comprises an air vent path formed with such a shape and size that it can positively be opened and closed under the action of liquid within the path, which can easily collect the portion of the liquid discharged from the air vent path with the undesirable bubbles, and which can positively and simply perform the removal of bubbles entering recording orifices due to any external disturbance in addition to the bubble vent operation.

Still another object of the present invention is to provide a liquid jet recording apparatus which comprises an air vent path formed with such a shape and size that the air vent operation can be carried out simultaneously with the removal of bubbles entering the recording orifices due to any external disturbance so that means for performing the air vent operation or jetting recovery operation will be simplified.

A further object of the present invention is to provide a liquid jet recording apparatus which comprises a liquid jet section including orifice means for discharging the liquid to form orifice means and having as a part an energy acting portion for causing energy to act on the liquid to form the droplets, and a liquid chamber communicating with the liquid passage means, characterized by air vent path means for extracting air from the liquid chamber, the air vent path means being formed in a member defining said liquid jet section such that the air vent path means has an inlet located in the liquid chamber and an outlet positioned in said liquid jet section, and said air vent duct means being defined by a groove formed in a plate in accordance with an etching process and said liquid passage means being defined by a groove formed in said plate according to the same etching process.

BRIEF DESCRIPTION OF THE DRAWINGS

FIG. 3 is a view similar to FIG. 1 showing another form of the recording head according to the present invention; and FIG. 4 is a view similar to FIG. 1, showing still another form of the recording head according to the present invention.

DESCRIPTION OF THE PREFERRED EMBODIMENTS

An embodiment according to the present invention will hereinafter be described specifically by reference to the drawings.

Figure 1:
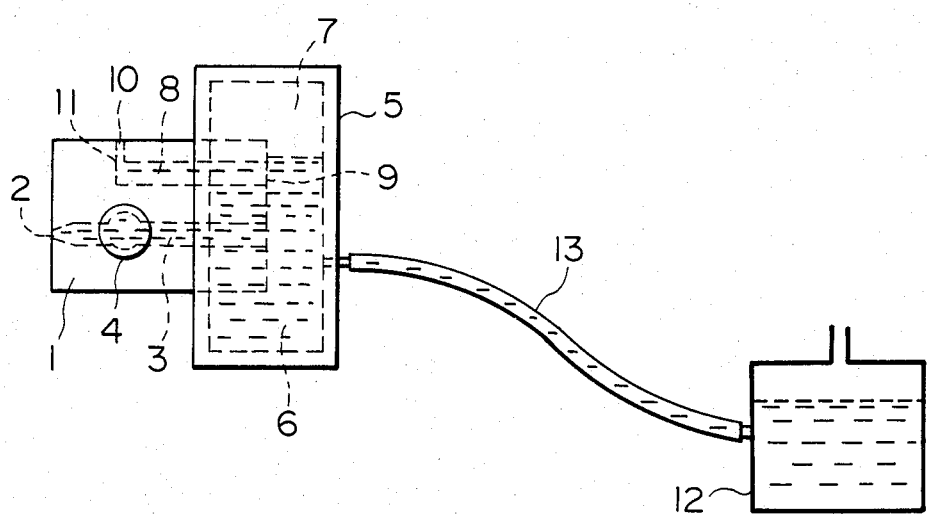
FIG. 1 is a schematically sectional view showing an embodiment of the liquid jet recording apparatus according to the present invention.

FIG. 1 is a schematically sectional view showing an embodiment of the liquid jet recording apparatus according to the present invention.

Referring to the drawings, there is shown a liquid spray type recording apparatus of the present invention which comprises a liquid jet section 1 including an orifice 2 and a liquid path 3 communicating with the orifice 2. The liquid path 3 includes an energy acting portion consisting of an energy generating element 4 connected with a drive circuit through any suitable wiring (not shown). This element 4 is adapted to generate energy which acts on the liquid in the liquid path 3 to jet it through the orifice 2. Although FIG. 1 shows a single liquid path 3 for simplification, a plurality of liquid passages may normally be provided in the recording head. FIG. 1 also shows that the liquid path 3 has a wide portion at the position where the energy generating element 4 is provided. However, the liquid path 3 may be made to have a constant width that is, the width of the liquid path 3 may be made to be unvaried.

The apparatus also includes a liquid chamber 5 communicating with the liquid path 3 and containing the liquid 6 to be supplied to the liquid path 3. Remaining air 7 is accumulated above the liquid 6 and an air vent tube 8 for discharging the remaining air therethrough is provided within the member forming the liquid jet section 1. The inlet 9 of the tube 8 is opened to the liquid chamber 5 with the outlet 10 thereof formed in the liquid jet section 1. A capillary passage tube 11 is formed in the liquid jet section 1 between the outlet 10 and the air vent path 8. Thus, the outlet 10 of the air vent path 8 is preferably positioned at a location corresponding to the relatively upper portion of the liquid chamber 5 and at least above the liquid path 3. The size of the air extracting duct 8 should be selected in consideration of the following respect: If the opening area of the outlet 10 is S, the average opening diameter $\sqrt{S}$ of the outlet 10 is selected to obtain a meniscus holding force sufficient to prevent the liquid (ink) from freely leaking out of the duct 8. The length l of the air vent path 8 should be selected to provide a sufficiently small flow resistance for the air such that when a suction is applied to the outlet 10, the liquid chamber 5 can easily be filled with the liquid. In view of these considerations, it is desirable that in accordance with the present invention, the amount of $\sqrt{S}$ is preferably in the range of $5\mu$ to $50\mu$, more preferably $5\mu$ to $40\mu$; and flow length l of the air vent path 8 is preferably in the range of $50\mu$ to 5 mm, more preferably $70\mu$ to 3 mm.

There is no drawback in that the air 7 is retained within the liquid chamber 5 so far as droplets from the orifice 2 will not create various problems as indicated hereinbefore. The liquid is supplied from a liquid storage tank 12 to the liquid chamber 5 through a flexible supplying tube 13.

Figure 2:
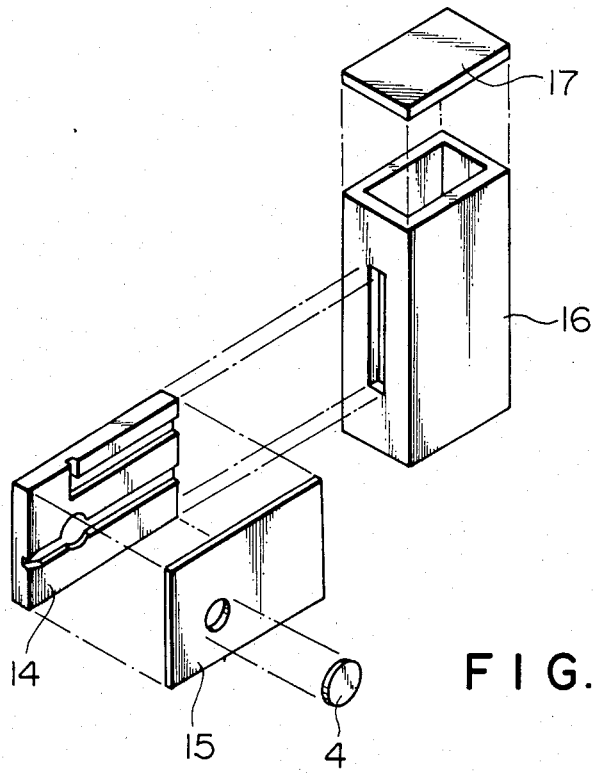
FIG. 2 is an exploded and perspective view showing the recording head of the liquid jet recording apparatus shown in FIG. 1.

FIG. 2 shows the details of the liquid jet section and liquid chamber 1, 5 in the liquid jet recording apparatus shown in FIG. 1.

The liquid jet section 1 comprises a base plate 14 of Fotoceram available from Corning Company, on which the orifice 2, the liquid path 3 and the air vent 8 are formed in the form of grooves by the use of etching. The liquid jet section 1 also comprises a top plate 15 made of stainless steel and having a thickness of 0.2 mm. The top plate 15 has an opening formed therein by etching at a position in which the energy generating element 4 is to be mounted. The base plate 14, top plate 15 and energy generating element 4 are assembled into a unit, for example, by the use of any suitable adhesive. On the other hand, a box-like member 16 defines the liquid chamber 5 and is closed at its top opening by a closure 17 which may be injection molded from a thermoplastic resin and bonded to the top opening of the member 16 as by the use of any suitable adhesive. The liquid jet section 1 is then assembled into the box-like member 16 to form a recording head in the liquid jet type recording apparatus.

In the illustrated embodiment of FIG. 2, the grooves defining the orifice 2, liquid path 3 and air vent path 8 are formed directly on the base plate 14. However, the present invention is not limited to this manner. For example, these grooves may be formed by applying a photosensitive resin to the base plate and then selectively removing the photosensitive resin to form a pattern including the grooves or by removing the material of the base plate through an etching process to form slits at positions corresponding to the grooves and laminating a plate of metal or the like on the etched base plate.

In such an arrangement, when the liquid storage tank 12 is pressurized by any suitable pressurizing means (not shown) or when a suction is applied to the outlet 10 of the air vent path 8 through any suitable suction means (not shown), the remaining air 7 is drawn out from the liquid chamber 5 together with a portion of the liquid within the liquid chamber 5. When the pressurization or suction is stopped, the air vent path 8 is automatically closed under the action of capillarity by the liquid within the capillary tube portion 11.

In the liquid jet recording apparatus according to the present invention, the air vent path 8 with the same accuracy as that cf the liquid path can be secondary formed in the process of fabricating the liquid jet portion 1 so that it is possible to economically mass-produce the apparatus, because the air vent path 8 is formed in the member forming the liquid jet portion 1. Additionally, the reliability of the capillarity for holding the liquid can remarkably be improved since the capillary tube portion can more accurately be formed in the base plate, in size and in dimension.

FIG. 3 shows another embodiment of the present invention in which the air vent path 8 has an orifice-like outlet 18 formed therein in place of the capillary tube portion 11 as in the previous embodiment. Similarly, this orifice-like outlet 18 serves to hold the liquid in the air extracting duct 8.

Since the remaining air 7 and the liquid 6 are simultaneously moved from the liquid chamber 5 through the air vent path 8, alternate bodies of liquid and air may be remained within the air vent path 8. This may cause the liquid holding force in the capillary tube portion 11 to increase excessively. To avoid such a problem, it is therefore required to preselect the pressure to the liquid storage tank 12 or the suction to the outlet 10 of the air vent path 8 at a sufficiently high level. However, this is undesirable since an excessive amount of liquid may be wasted in the air extracting operation and also since the size of a container for collecting the extracted liquid must be increased. If an orifice functioning as a capillary tube is formed in the air extracting duct 8 at its inlet or at an intermediate position between the inlet and outlet of the air vent path 8, the latter may be filled with the liquid across the orifice. In such a case, the liquid will normally be moved rearwardly toward the liquid chamber 5 through the air extracting duct 8 when the pressure or suction is stopped. When the interface between the liquid and air reaches the orifice, the rearward movement of the liquid is restrained under the capillary action. If the apparatus is angularly positioned with its inclined attitude, however, the liquid may be moved from the liquid chamber through the air vent path to the outlet thereof whereat the liquid flows outwardly. This problem can be overcome by the fact that the orifice is positioned at the outlet of the air vent path 8 as in the second embodiment of FIG. 3.

FIG. 4 shows the third embodiment of the present invention in which the outlet 10 of the air vent path 8 is formed on the liquid jet section 1 in the same plane as the orifice 2 is formed therein.

In the liquid jet recording apparatus according to the drop-on-demand method, droplets may unstably be jetted if air bubbles enter the liquid path due to any external disturbance. In the worst case, it will be impossible to jet droplets. This requires that the bubbles are removed from the liquid path by pressurizing the liquid storage tank 12 or by drawing the liquid path through the orifice 2, which is called "jet recovery operation". This jet recovery operation provides various problems, for example, the leakage of liquid through the air vent path when the liquid storage tank 12 is pressurized or the reverse flow of air into the air vent path 8 when the suction is applied thereto. The necessary air vent operation also provides problems similar to the above problems produced in the spray recovery operation. By the fact that the outlet 10 of the air vent path 8 is provided in the same plane as the orifice 2 of the liquid jet section 1 is formed, one can extremely easily deal with these problems. For example, when the jet recovery operation or the air vent operation is carried out by pressurizing the liquid storage tank 12, the liquid flowing outwardly through the orifice 2 and air extracting duct 8 can readily be collected into the same liquid container.

Even when a suction is applied to the orifice and the outlet of the air vent path for the jet recovery operation or the air vent operation, they can simultaneously be drawn by the use of a common suction device while preventing the reverse flows of air through both the orifice and the outlet of the air vent path.

If the air vent path and the liquid path are formed with the same shape and size, their liquid holding forces and tube resistances due to the viscosity of the liquid become substantially equal to each other. The pressurization and suction can be selected under the same condition for both the jet recovery and air vent operations.

The embodiment of FIG. 4 is thus extremely advantageous in that means for effecting the air vent or jet recovery operation can be simplified resulting in reduced size and manufacturing cost with respect to the liquid jet recording apparatus.

In accordance with the present invention, the liquid jet recording apparatus can very economically be mass-produced since the liquid path and the air vent path are simultaneously formed in the liquid jet section. The liquid path and the air vent path can be formed with their accurate shape and size so that the reliability on holding the liquid can remarkably be improved. If the outlet of the air vent path is provided in the same plane as the orifice of the liquid jet section is formed, additional means for receiving the discharged liquid portion or preventing the reverse flow of air in the jet recovery or air vent operation can be simplified and used in common with each other. Furthermore, if the air vent path is substantially equal to the liquid passage in shape and size, additional means for pressurizing or drawing the apparatus for the spray recovery or air vent operation can be simplified and used in common with each other. This contributes to reduce the size and manufacturing cost with respect to the liquid jet recording apparatus.

What I claim is:

1. A liquid jet recording apparatus comprising a liquid jet section including orifice means for discharging a liquid to form flying droplets and liquid path means communicating with said orifice means and having as a part an energy acting portion for causing the energy to act on the liquid to form said flying droplets, and a liquid chamber communicating with said liquid path means and containing the liquid supplied to said liquid path means, characterized by an air vent path formed in a member defining said liquid jet section and used to extract air from said liquid chamber, said air vent path having an inlet opened to said liquid chamber and an outlet formed on said liquid jet section, and said air vent path being defined by a groove formed on a plate by etching, on which plate groove means defining said liquid path means is similarly formed.

2. A liquid jet recording apparatus according to claim 1, wherein the outlet of said air vent path is in the form of an orifice.

3. A liquid jet recording apparatus according to claim 1, wherein the outlet of said air vent path is co-planar with the orifice of said liquid jet section.

4. A liquid jet recording apparatus according to claim 1, wherein said air vent path is substantially equal to said liquid path means in shape and size.

5. A liquid jet recording apparatus according to claim 1, wherein said air vent path has $\sqrt{S}$ in the range of $5\mu$ to $50\mu$ and a length in the range of $50\mu$ to 5 mm where the opening area in said outlet is S.

* * * * *

UNITED STATES PATENT AND TRADEMARK OFFICE
CERTIFICATE OF CORRECTION

PATENT NO. : 4,536,777
DATED : August 20, 1985
INVENTOR(S) : HARUYUKI MATSUMOTO

It is certified that error appears in the above-identified patent and that said Letters Patent is hereby corrected as shown below:

Column 1, line 67, delete "are" and "in".

Column 2, line 10, change "the" (second occurrence) to --this-- and change "this" to --the--;
        line 19, insert --of-- following "closure";
        line 54, insert --to-- after "is".

Column 3, line 67, change "$\sqrt{\phantom{x}}$" to --$\sqrt{\phantom{x}}$--.

Column 4, line 63, change "cf" to --of--.

Column 6, line 64, change "$\sqrt{\phantom{x}}$" to --$\sqrt{\phantom{x}}$--.

Signed and Sealed this

Twenty-second Day of April 1986

[SEAL]

Attest:

DONALD J. QUIGG

Attesting Officer     Commissioner of Patents and Trademarks